United States Patent
Blackwell et al.

(10) Patent No.: US 6,376,010 B1
(45) Date of Patent: Apr. 23, 2002

(54) GERMANIUM DOPED SILICA FORMING FEEDSTOCK AND METHOD

(75) Inventors: Jeffery Lynn Blackwell; Lisa Anne Moore; Carlton Maurice Truesdale, all of Corning, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/098,055

(22) Filed: Jun. 16, 1998

(30) Foreign Application Priority Data

Feb. 4, 1997 (WO) ............................... PCT/US97/23123

(51) Int. Cl.[7] ............................................. B05D 5/06
(52) U.S. Cl. ................. 427/163.2; 528/33; 264/1.29; 264/1.24; 385/141; 385/142; 385/143; 65/399; 65/385; 65/413; 65/414; 65/423; 65/435
(58) Field of Search ........................... 528/33; 264/1.29, 264/1.24; 385/141, 142, 143; 65/399, 385, 413, 414, 423, 435; 427/163.2

(56) References Cited

U.S. PATENT DOCUMENTS

| | | | |
|---|---|---|---|
| 3,934,061 A | 1/1976 | Keck et al. ................. 427/165 |
| 4,203,553 A | 5/1980 | Bachman et al. ............ 239/420 |
| 4,425,146 A | 1/1984 | Izawa et al. ................. 65/18.2 |
| 4,495,297 A | 1/1985 | Puyané et al. ................ 501/12 |
| 4,501,602 A | 2/1985 | Miller et al. ................ 65/18.2 |
| 4,604,118 A | 8/1986 | Bocko et al. ................ 65/18.2 |
| 4,680,048 A | 7/1987 | Motoki et al. .................. 65/17 |
| 4,682,994 A | 7/1987 | Mansfield .................... 65/3.12 |
| 4,880,163 A | 11/1989 | Kobayashi et al. .......... 239/422 |
| 4,885,186 A | 12/1989 | Bagley et al. ................. 427/38 |
| 5,043,002 A | 8/1991 | Dobbins et al. ............. 65/3.12 |
| 5,078,092 A | 1/1992 | Antos et al. ................. 118/726 |
| 5,116,400 A | 5/1992 | Abbott et al. ................ 65/144 |
| 5,123,940 A | 6/1992 | DiGiovanni et al. ......... 65/3.12 |
| 5,141,549 A | 8/1992 | Tumminelli ................. 65/18.2 |
| 5,152,819 A | 10/1992 | Blackwell et al. ........... 65/3.12 |
| 5,154,744 A | 10/1992 | Blackwell et al. ........... 65/3.12 |
| 5,324,539 A | 6/1994 | Maeda et al. ............. 427/255.3 |
| 5,385,594 A | 1/1995 | Kanamori et al. ........... 65/60.2 |
| 5,503,650 A | 4/1996 | Ishikawa et al. .............. 65/384 |
| 5,527,871 A | 6/1996 | Tani et al. ..................... 528/10 |
| 5,548,051 A | 8/1996 | Michalczyk et al. .......... 528/15 |

FOREIGN PATENT DOCUMENTS

| | | |
|---|---|---|
| DE | 3518620 | 11/1986 |
| EP | 0 092 024 B1 | 10/1983 |
| EP | 0 038 900 B1 | 3/1984 |
| EP | 0 146 659 B1 | 3/1988 |
| EP | 0 160 244 B1 | 12/1988 |
| EP | 0 463 045 B1 | 1/1992 |
| EP | 0 678 763 A1 | 10/1995 |
| EP | 0 709 487 A1 | 5/1996 |
| FR | 2 451 343 | 11/1980 |
| JP | 57-8506 | 1/1982 |
| JP | 60-90305 | 5/1985 |
| JP | 90838-1985 | 5/1985 |
| JP | 60-180338 | 9/1985 |
| JP | 63-66511 | 3/1988 |
| JP | 63-282133 | 11/1988 |
| JP | 4-74728 | 3/1992 |
| WO | WO 90/10596 | 9/1990 |
| WO | WO 98/27018 | 6/1998 |

OTHER PUBLICATIONS

Patent Abstracts of Japan, vol. 17, No. 205, Apr. 22, 1993, and JP 04349147, Dec. 3, 1992.
Corning SMF–28™ CPC6 Single–Mode Optical Fiber 10/94.
Dialog Web Patent Abstract for DE3518620.
Dialog Web Patent Abstract for FR 2 451 343.
Dialog Web Patent Abstract for JP 63–66511.
Dialog Web Patent Abstract for JP 63–282133.
Dialog Web Patent Abstract for JP 60–180338.

*Primary Examiner*—Margaret G. Moore
(74) *Attorney, Agent, or Firm*—Timothy R. Krogh; Edward F. Murphy, III

(57) ABSTRACT

The present invention is directed to a silica forming feedstock and a method of making optical waveguides and optical waveguide preforms. The feedstock for use in the manufacturing of germanium doped silica glass products includes a siloxane and a germanium dopant component such as germanium alkoxide. The invention further relates to the manufacturing of optical waveguides and optical waveguide preforms using a fluid feedstock which includes a siloxane and germanium dopant component, preferably germanium alkoxide.

26 Claims, 4 Drawing Sheets

GERMANIUM DOPED SILICA FORMING FEEDSTOCK AND METHOD

FIELD OF THE INVENTION

The present invention relates to silica feedstock compositions. More particularly, the present invention relates to silica forming feedstocks, and the manufacturing of optical waveguide preforms.

BACKGROUND OF THE INVENTION

Various processes are known that involves the production of metal oxides from a variety of feedstocks. Such processes require a feedstock and a means of catalyzing oxidation and combustion of the feedstock to convert the feedstock into finely divided aggregates called soot. This soot can be collected on deposition surfaces, ranging from a collection chamber to a rotating mandrel. The soot may be simultaneously or subsequently heat treated to form a high purity glass article. This process is usually carried out using specialized conversion site equipment having an arrangement of delivery tubes and flame generating burners.

Much of the initial research that led to the development of such processes, including flame hydrolysis, focused on the production of silica glass products such as bulk fused silica. Selection of an appropriate feedstock which can be converted into the desired silica glass composition is an important aspect of such research. Commercial production of silica glass by such a conversion process became and is continued to be dominated by the use of silicon tetrachloride ($SiCl_4$) as the feedstock's source of silicon. The high vapor pressure of silicon tetrachloride and its purity has made it a useful and convenient source of vapor for conversion into $SiO_2$ soot. This use of silicon tetrachloride provides a high purity silica glass and has been the commercially preferred method of manufacturing silica glass for use in optical waveguide products and particularly the manufacturing of optical waveguide fibers and their preforms. Such use of silicon tetrachloride in the manufacturing of optical waveguides has led to the adoption of other similar chloride-based feedstocks which are compatible and used in conjunction with silicon tetrachloride to provide beneficial silica glass compositions and corresponding indexes of refraction which are able to guide light. The silica glass dopant feedstock vapor $GeCl_4$ is used in conjunction with $SiCl_4$ vapors to form silica glass compositions doped with appropriate levels of germanium dioxide which are utilized in the manufacturing of optical waveguides. This has led to the presently accepted use of $SiCl_4$ vapors and $GeCl_4$ vapors in the manufacturing of optical waveguide silica glass cores doped with $GeO_2$, even though such feedstocks result in the production of hazardous by products such as hydrochloric acid (HCl).

In light of this, there is a need for a germanium doped silica feedstock and a method of forming optical waveguide preforms which results in an optical waveguide product such as an optical fiber while avoiding the hazardous by products of the prior art.

SUMMARY OF THE INVENTION

Accordingly, the present invention is directed to a silica forming feedstock and method of forming optical waveguides and optical waveguide preforms that substantially obviates one or more of the problems due to limitations and disadvantages of the related art.

The principal advantage of the present invention is to provide a silica forming feedstock, which produces a germanium, doped silica glass which allows for the manufacturing of optical waveguides and preforms thereof without the production of hazardous halides.

Additional features and advantages of the invention will be set forth in the description, which follows, and in part will be apparent from the description, or may be learned by practice of the invention. The objectives and other advantages of the invention will be realized and attained by the methods and compositions of the invention particularly pointed out in the written description and claims hereof as well as the appended drawings.

To achieve these and other advantages in accordance with the purpose of the invention, as embodied and broadly described, the invention is a fluid feedstock including siloxane and a germanium compound.

In another aspect, the invention includes a method of using the inventive feedstock in the formation of optical waveguide preforms and optical waveguides.

In a further aspect, the invention includes the making of optical waveguide preforms, which are predecessors and physical embodiments of an optical waveguide product prior to the final forming of the preform into the optical waveguide product, such as by drawing a preform into an optical waveguide fiber.

In another aspect, the invention includes the forming of optical waveguide preforms by such processes as cladding, drying, consolidating, stretching, caning, overcladding, and reconsolidating.

In a further aspect, the invention includes a method of making low loss optical fiber by converting a siloxane and germanium alkoxide feedstock into a $GeO_2$ doped silica glass.

In another aspect, the invention includes an optical waveguide silica feedstock and an optical fiber silica feedstock, which includes a siloxane and a germanium alkoxide.

It is to be understood that both the foregoing general description and the following detailed description are exemplary and explanatory and are intended to provide further explanation of the invention as claimed.

The accompanying drawings are included to provide a further understanding of the invention and are incorporated in and constitute a part of this specification, illustrate embodiments and aspects of the invention and together with the description serve to explain the principles of the invention.

DETAILED DESCRIPTION OF THE INVENTION

Figure 1:
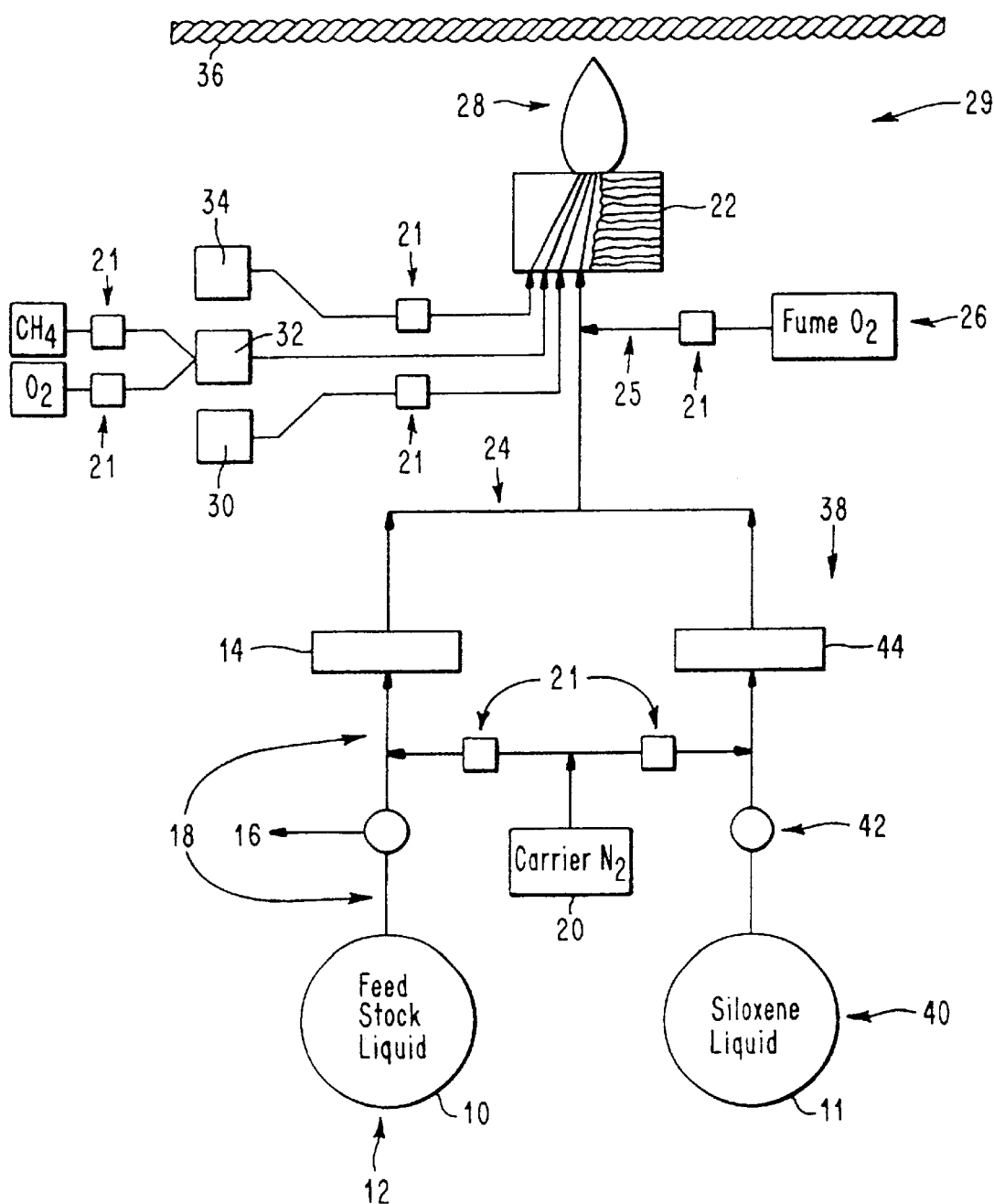
FIG. 1 comprises a schematic representation of the method and apparatus set up of the invention.

Reference will now be made in detail to the present preferred embodiments of the invention, examples of which are illustrated in the accompanying drawings.

The silica forming feedstock of the invention includes a siloxane and a germanium alkoxide. Preferably, the siloxane component of the feedstock fluid is a polyalkysiloxane, more preferably a cyclic polyalkysiloxane, and most preferably octamethylcyclotetrasiloxane $[SiO(CH_3)_2]_4$. The preferred germanium alkoxide is germanium ethoxide $[Ge(OC_2H_5)_4]$. Germanium ethoxide and octamethylcyclotetrasiloxane are both liquids at standard atmospheric pressure and room temperature.

Germanium alkoxide and siloxane are mixed in proportions to provide a target $GeO_2$ dopant concentration desired in the silica soot. Such a $GeO_2$ dopant concentration gives the glass, and usually in the waveguiding core formed from the glass, a refractive index appropriate for guiding light when the $GeO_2$ doped glass is cladded with a glass having a different refractive index, usually silica glass. When germanium ethoxide and octamethylcyclotetrasiloxane are used they are mixed by weight in a ratio ranging from 1 part $Ge(OC_2H_5)_4$: 2 to 4 parts $[SiO(CH_3)_2]_4$, with the preferred weight ratio of the feedstock mixture being 1 part $Ge(OC_2H_5)_4$: 3 parts $[SiO(CH_3)_2]_4$.

The use of octamethylcyclotetrasiloxane with germanium alkoxides, in particular germanium ethoxide, as the feedstock mixture of the invention is preferred because of the compatibility of these two compounds when used in practicing the invention. During the practicing of the invention germanium ethoxide and octamethylcyclotetrasiloxane liquids were mixed together in a normal air atmosphere without any evidence of reaction and the mixture remained clear. In addition, the two compounds are compatible in that the conditions of a conversion flame are suitable for the formation of $GeO_2$ doped $SiO_2$ soot. The co-combustion of the germanium ethoxide vapor and the octamethylcyclotetrasiloxane vapor in a flame provide for $GeO_2$ doped $SiO_2$ with $GeO_2$ concentrations greater than 8 wt. % and soot densities less than 0.6 g/cc, both of which are preferred in the production of optical fiber by outside vapor deposition. High concentrations of $GeO_2$ doping, such as 30-wt. % $GeO_2$, are achievable using the compositions of the invention. It has been found that the collection efficiency of $GeO_2$ is dependent on the amount of octamethylcyclotetrasiloxane present in the flame with the germanium ethoxide. In preferred embodiments octamethylcyclotetrasiloxane and $O_2$ levels are used to favor the $GeO_2$/GeO equilibrium to the production of $GeO_2$.

The silica forming feedstocks of the invention based on siloxane and germanium alkoxide range from:

1 to 99 wt. % germanium alkoxide and 1 to 99 wt. % siloxane;

more preferably 14 to 35 wt. % germanium alkoxide and 65 to 86 wt. % siloxane; and most preferably 18 to 30 wt. % germanium alkoxide and 70 to 82 wt. % siloxane, with the preferred germanium alkoxide being germanium ethoxide and the preferred siloxane being octamethylcyclotetrasiloxane.

These feedstock compositions should be used in the making of optical waveguides and optical waveguide preforms with the following burner condition ranges of:

| Delivery rate of feedstock mixture: | 3 to 12 g/min |
|---|---|
| Total burner $O_2$: | 4 to 20 slpm |
| Carrier $N_2$: | 0.5 to 2.4 slpm |
| Inner Shield $N_2$: | 2.5 to 3.5 slpm | and the understanding that the overall burner stoichiometry should be greater than 0.8, the premix flow should be kept low to minimize the flame temperature to achieve a high $GeO_2$ retention level, such as $CH_4+O_2$ premix <4 slpm, and minimize the carrier $N_2$ and inner shield $N_2$ flow rates while maintaining a constant feedstock vapor flow and inhibiting the fume stream from touching down on the burner face.

In addition to utilizing germanium alkoxides, such as germanium ethoxide and germanium methoxide, for the germanium dopant source compound of the feedstock, the germanium dopant source compounds include:

bimetallic organogermyls such as digermanes (Ge-Ge) and di-germoxanes (Ge-O-Ge);

germanium alkylalkoxides; and germanium alkyls.

Digermanes, such as hexamethyldigermane, and di-germoxanes, such as hexamethyldigermoxane, which are compatible with siloxanes may be used in the silica forming feedstock.

Germanium alkylalkoxides,

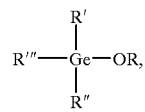

such as (acetyloxy)triethylgermane, which are compatible with siloxanes may be used in the silica forming feedstock.

Germanium alkyls,

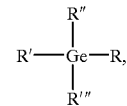

such as tetraethylgermane, which are compatible with siloxanes may be used in the silica forming feedstock.

An exemplary schematic representation of the method of making an optical waveguide preform utilizing the inventive feedstocks is shown in FIG. 1.

As shown in FIG. 1, the method of the invention includes the step of providing a silica forming fluid feedstock 10, preferably comprised of a siloxane and a germanium alkoxide. Germanium alkoxide and siloxane in liquid form are mixed together to form feedstock 10 and stored in storage container 12. The method of the invention further includes the step of delivering fluid feedstock 10 to a conversion site 29 as shown in FIG. 1. Fluid feedstock 10 is kept under a dry nitrogen atmosphere to prevent hydrolyzation. Teflon tubing is utilized in the liquid feedstock delivery system to preserve the feedstock's high purity. The feedstock is delivered to flash vaporizer 14 at a controlled rate by controllable pump 16 through teflon tubing conduits 18. Flash vaporizer 14 is comprised of a machined aluminum block which is held at an elevated temperature, preferably in the range of 180°–185° C., so that the liquid feedstock is immediately vaporized on contact with the vaporizer at the controlled rate of delivery. The mixed vapors of germanium alkoxide and siloxane are delivered to burner 22 through vapor delivery conduit 24 made of stainless steel along with a nitrogen carrier gas supplied from $N_2$ carrier gas supply 20. The $N_2$ gas delivery flow rate and the flow rate of other gas delivery systems of the invention are controlled by gas flow controllers 21 as shown in FIG. 1. Gas flow controllers 21 can be mass flow controllers and other flow regulators. Oxygen is added to the germanium alkoxide, siloxane, and nitrogen vapor mixture just prior to being delivered to burner 22, from fume $O_2$ source 26 through flow controller 21 and conduit 25.

Conduits 24 and 25 are heated to greater than 185° C. in order to maintain the vapor state of the feedstock.

An alternative method of delivery may be used wherein the liquid feedstocks of germanium alkoxide and siloxane are stored in separate storage containers and delivered to separate vaporizers. The feedstock vapors produced by such separate vaporizers are then mixed together in the vapor delivery conduit prior to delivery to the burner. In addition, the feedstock components could be delivered separately to a mixing chamber and then to a vaporizer or mixed at the vaporizer. In addition, the feedstock mixture and its components can be utilized in a liquid delivery system as disclosed in U.S. Provisional Application No. 60/008,889 by Hawtof et al., the disclosure of which is herein incorporated by reference.

The method of the invention further includes the step of converting the delivered fluid feedstock into $GeO_2$ doped $SiO_2$ soot.

As shown in FIG. 1, the fluid mixture of germanium alkoxide, siloxane, nitrogen and oxygen vapors are delivered through the central fume tube of gas-oxy focus burner 22 to conversion site flame 28 where the feedstock is converted to $GeO_2$ doped $SiO_2$ soot. The central tube of focused burner 22 is surrounded by oxygen inner shield regulated supply 30, then methane and oxygen premix regulated supply 32, and then oxygen outer shield regulated supply 34 which are used to control the characteristics of conversion flame 28 and the converting of the germanium alkoxide and siloxane vapor feedstock into $GeO_2$ doped $SiO_2$ soot which is deposited on the deposition surface of a polycrystalline alumina bait rod 36.

An alternative method of converting the feedstock is to use a gas-oxy focus burner configuration wherein the fluid feedstock, $N_2$, and $O_2$ mixture is delivered through the central fume tube which is surrounded by a $N_2$ inner shield regulated supply, then a fume shield $O_2$ regulated supply, then a methane and oxygen premix regulated supply. The $N_2$ inner shield regulated supply gas lines and the fume shield $O_2$ regulated supply gas lines should be heated in order to inhibit build up on the burner face.

The method of the invention includes the step of depositing the $GeO_2$ doped $SiO_2$ soot on a deposition surface. The $GeO_2$ doped $SiO_2$ soot is deposited and collected on the deposition surface of bait rod 36 to form the preform of an optical waveguide core. When a sufficient amount of $GeO_2$ doped $SiO_2$ soot is deposited on the deposition surface to form an optical waveguide core, the delivery of the germanium alkoxide and siloxane fluid feedstock mixture to burner 22 is halted.

The method of the invention further includes the step of forming the deposited $GeO_2$ doped $SiO_2$ soot into an optical waveguide preform. Siloxane fluid 11 is delivered to burner 22 in place of feedstock mixture 10 in order to form a cladding over the deposited $GeO_2$ doped $SiO_2$ soot. Siloxane feedstock delivery system 38 operates in the same manner as the germanium alkoxide and siloxane vapor feedstock mixture delivery system but only delivers siloxane, preferably octamethylcyclotetrasiloxane, $O_2$, and $N_2$ to burner 22 which is converted at conversion site 29 by flame 28 into undoped $SiO_2$ soot. This undoped $SiO_2$ soot is deposited over the $GeO_2$ doped $SiO_2$ soot to form the preform of the optical waveguide cladding.

After a sufficient amount of undoped $SiO_2$ soot is deposited over the $GeO_2$ doped $SiO_2$ soot, the deposition of soot is halted. The porous soot optical waveguide preform, which has formed around the bait rod, is removed from the bait rod. The porous soot preform is dried in a helium and chlorine atmosphere and sintered into a clear, fully dense consolidated glass cylindrical optical waveguide preform that is comprised of a $GeO_2$ doped silica waveguiding core structure surrounded by a silica cladding structure. This consolidated preform is stretched into an optical waveguide cane preform. This preform is overcladded with additional undoped silica soot such as produced by siloxane feedstock delivery system 38 during the formation of the cladding soot. An alternative method is to overclad the preform with undoped silica soot produced by the flame hydrolysis of $SiCl_4$.

The overcladded preform is reconsolidated and may be drawn into an optical waveguide fiber.

EXAMPLE 1

An optical waveguide preform was formed using the setup of FIG. 1 and then drawn into an optical waveguide fiber. The silica forming feedstock 10 comprised a mixture of 1 part by weight of germanium ethoxide and 3 parts by weight of octamethylcyclotetrasiloxane and was stored in storage container 12. Feedstock 10 was pumped by controllable pump 16 to flash vaporizer 14 at 3.6 grams per minute where feedstock 10 was vaporized. In forming the fiber core, the vaporized feedstock 10 was delivered to burner 22 by a $N_2$ carrier gas flow of 2.4 slpm (standard liters per minute) supplied by carrier $N_2$ supply 20. Fume $O_2$ was added to the vaporized feedstock mixture just prior to the burner by $O_2$ fume source 26 at 4.5 slpm.

The vaporized feedstock was converted in flame 28 into $GeO_2$ doped $SiO_2$ soot and deposited on bait rod 36. Flame 28 was maintained by the supply of 2.5 slpm of $O_2$ by inner $O_2$ shield supply 30, 2.0 slpm of $CH_4$ and 1.0 slpm of $O_2$ by $CH_4+O_2$ premixed supply 32, and 2.0 slpm of $O_2$ by outer $O_2$ shield supply 34.

These delivery rates were maintained for 150 minutes and 22 grams of $GeO_2$–$SiO_2$ soot were deposited on bait rod 36 to form the core of the optical fiber preform.

Then $SiO_2$ soot was deposited over this $GeO_2$-$SiO_2$ soot to form the cladding of the preform. 4.0 grams per minute of octamethylcyclotetrasiloxane were delivered from octamethylcyclotetrasiloxane storage container 40 through pump 42 to flash vaporizer 44. Vaporized octamethylcyclotetrasiloxane was delivered to burner 22 by a $N_2$ carrier gas flow of 2.4 slpm supplied by carrier $N_2$ supply 20. 3.5 slpm of fume $O_2$ was added to the vaporized octamethylcyclotetrasiloxane just prior to burner 22 by $O_2$ fume source 26. This vaporized octamethylcyclotetrasiloxane flow was converted in flame 28 into $SiO_2$ soot and deposited on top of the $GeO_2$–$SiO_2$ soot. Flame 28 was maintained by the supply of 3.0 slpm of $O_2$ by inner $O_2$ shield supply 30, 2.0 slpm of $CH_4$ and 1.0 slpm of $O_2$ by $CH_4+O_2$ premixed supply 32, and 2.0 slpm of $O_2$ by outer $O_2$ shield supply 34. These delivery rates were maintained for 300 minutes and 285 grams of soot were deposited.

Following this laydown of $SiO_2$ soot over the $GeO_2$-$SiO_2$ soot, the bait rod was removed, the preform was dried in a helium-chloride atmosphere, consolidated and stretched into a glass cane preform. This glass cane preform was then overcladded with additional $SiO_2$ soot. This overcladding of the preform was done in the same manner as the $SiO_2$ soot deposition over the $GeO_2$–$SiO_2$ soot except that, 7.0 grams per minute of octamethylcyclotetrasiloxane were delivered by 2.4 slpm of $N_2$ carrier with 6.0 to 5.5 slpm of fume $O_2$ added just prior to the burner. Flame 28 was maintained by 3.5–4.0 slpm of inner shield $O_2$, 2.0 slpm of $CH_4$ and 1.0 slpm of $O_2$ to $CH_4+O_2$ premix, and 2.0 slpm of outer shield O₂. These delivery rates were maintained for 270 minutes and 463 grams of soot were deposited. This overcladded core/clad cane preform was then reconsolidated into a preform, which was drawn into a single-mode optical waveguide fiber.

These germanium ethoxide, octamethylcyclotetrasiloxane, and oxygen delivery rates are preferred in order to provide for the complete combustion of the germanium ethoxide and octamethylcyclotetrasiloxane in accordance with the following reactions:

$$Ge(OC_2H_5)_4 + 12O_2 = GeO_2 + 8CO_2 + 10H_2O$$

$$[SiO(CH_3)_2]_4 + 16O_2 = 4SiO_2 + 8CO_2 + 12H_2O$$

These preferred delivery rates provide a burner oxygen stoichiometry greater than 0.8, wherein stoichiometry is defined as the ratio of total oxygen supplied to the burner to the amount of oxygen required to convert the octamethylcyclotetrasiloxane and germanium ethoxide through complete combustion to their product oxides of $GeO_2$ and $SiO_2$ as demonstrated in the above reaction equations. Without such oxygen delivery, reduced species of germanium and carbon were observed in the soot.

Figure 2:
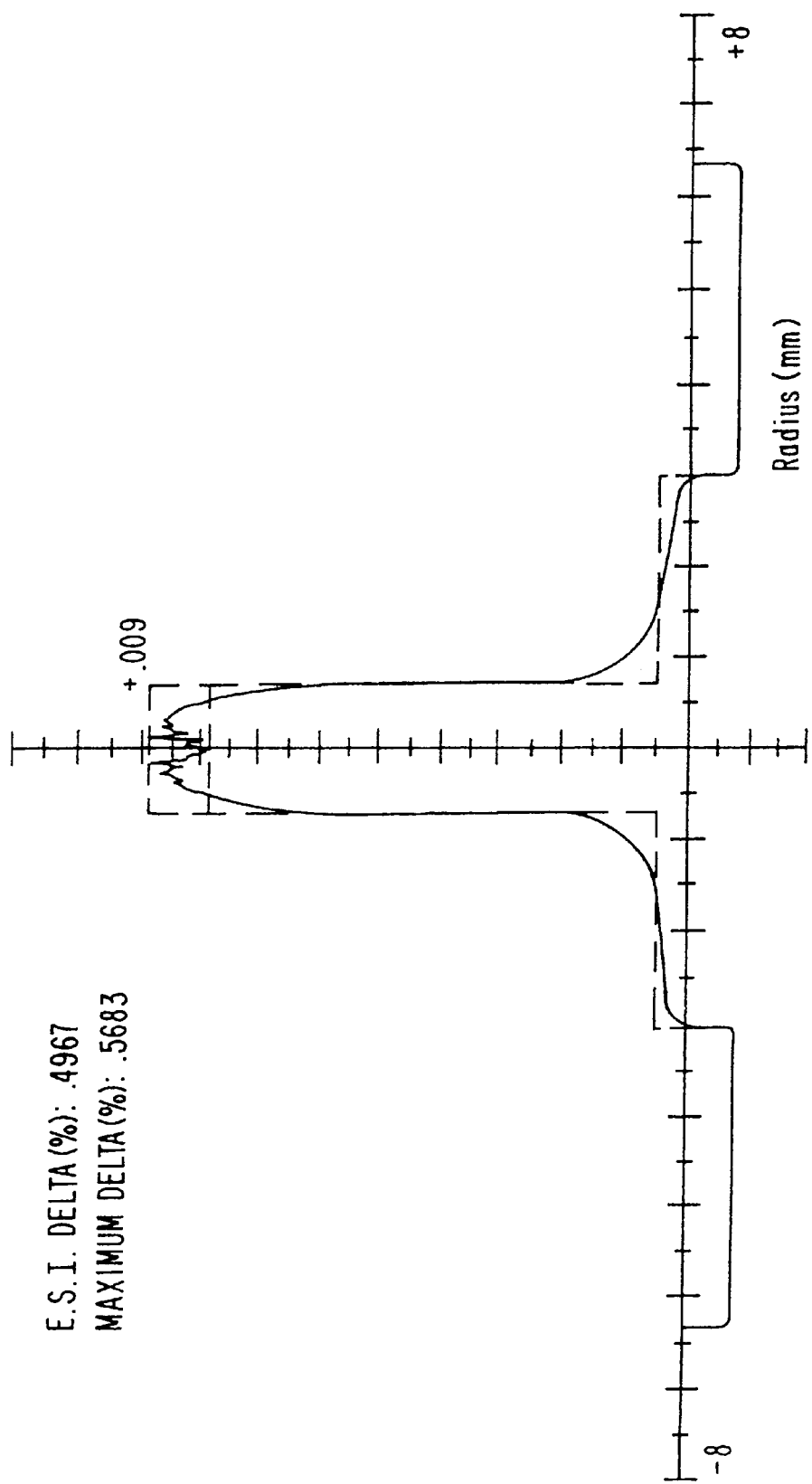
FIG. 2 is a refractive index profile of an optical waveguide preform in accordance with the teachings of the present invention, with the Y-axis representing the index of refraction of the preform and the X-axis representing the radius of the preform.
Figure 3:
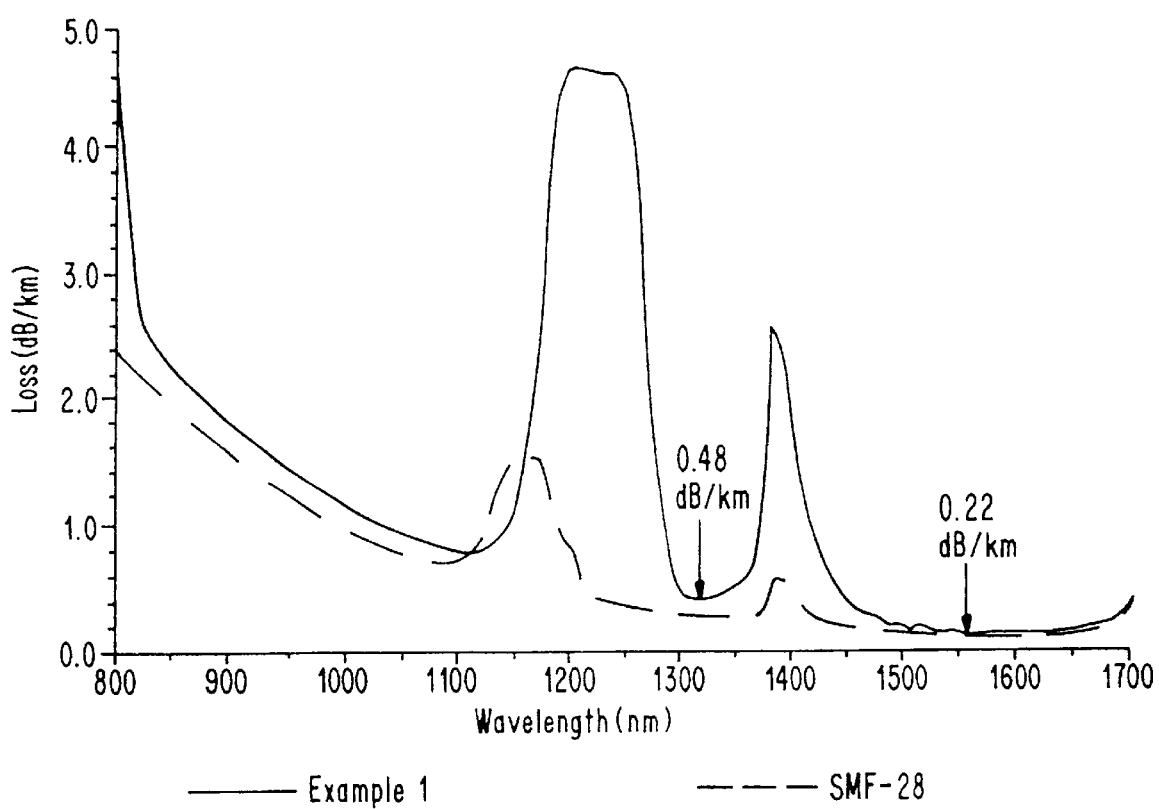
FIG. 3 is a plot of the spectral attenuation of an optical waveguide in accordance with the teachings of the present invention, with the Y-axis representing Loss (dB/km) and the X-axis representing Wavelength (nm).

Such delivery rates are preferred in order to provide beneficial attenuation characteristics of the fiber formed by the process. FIG. 2 shows the refractive index profile of the core/clad cane that was made using these preferred delivery rates. FIG. 3 shows the spectral attenuation curve of a 1 kilometer segment of single mode optical fiber of the invention that was made using the preferred delivery rates. It was surprising and unexpected that this method and use of germanium ethoxide and octamethylcyclotetrasiloxane optical waveguide silica feedstocks throughout the soot deposition process would result in an optical fiber with such beneficial characteristics including a loss of only 0.221 dB/km at 1550 nm. This is a particularly good attenuation level for a fiber using new feedstocks. In FIG. 3 the solid curve represents the spectral attenuation of the inventive optical fiber. For comparison, the dotted curve represents the spectral attenuation of a commercially available Corning SMF-28™ single-mode optical waveguide fiber, which was produced using a refined process comprised of the conversion of halide containing feedstocks.

EXAMPLE 2

An optical waveguide preform was made using a focus burner configuration wherein the octamethylcyclotetrasiloxane and germanium alkoxide fluid feedstock, $N_2$, and $O_2$ mixture was delivered through the central fume tube which was surrounded by an $N_2$ inner shield regulated supply, then a fume shield $O_2$ regulated supply, then a methane and oxygen premix regulated supply, with $N_2$ inner shield gas lines and the fume shield $O_2$ gas lines heated. The $GeO_2$ doped silica forming liquid feedstock was provided by mixing one part per weight of germanium ethoxide with 3.6 parts per weight of octamethylcyclotetrasiloxane. The optical waveguide preform was made using the following conditions table:

TABLE I

|  | Core | Clad | Overclad |
|---|---|---|---|
| Mix Ratio [SiO(CH₃)₂]₄:Ge(OC₂H₅)₄ (by wt.) | 3.6:1 | 1:0 | 1:0 |
| Delivery Rate of Mixture (g/min) | 6 | 6 | 7 |

TABLE I-continued

|  | Core | Clad | Overclad |
|---|---|---|---|
| Carrier N₂ (slpm) | 1.25 | 1.25 | 1.25 |
| Fume O₂ (slpm) | 1.8 | 1.8 | 2.4 |
| Inner Shield N₂ (slpm) | 3 | 3 | 3 |
| Fume Shield O₂ (slpm) | 6.8 | 6.8 | 5.1 |
| Premix CH₄ (slpm) | 1.1 | 1.1 | 1.1 |
| Premix O₂ (slpm) | 0.9 | 0.9 | 1.7 |
| Burner Stoichiometry | 0.97 |  |  |
| Deposition Time (min) | 240 | 270 | 435 |
| Weight of Soot (g) | 93 | 420 | 1100 |

Figure 4:
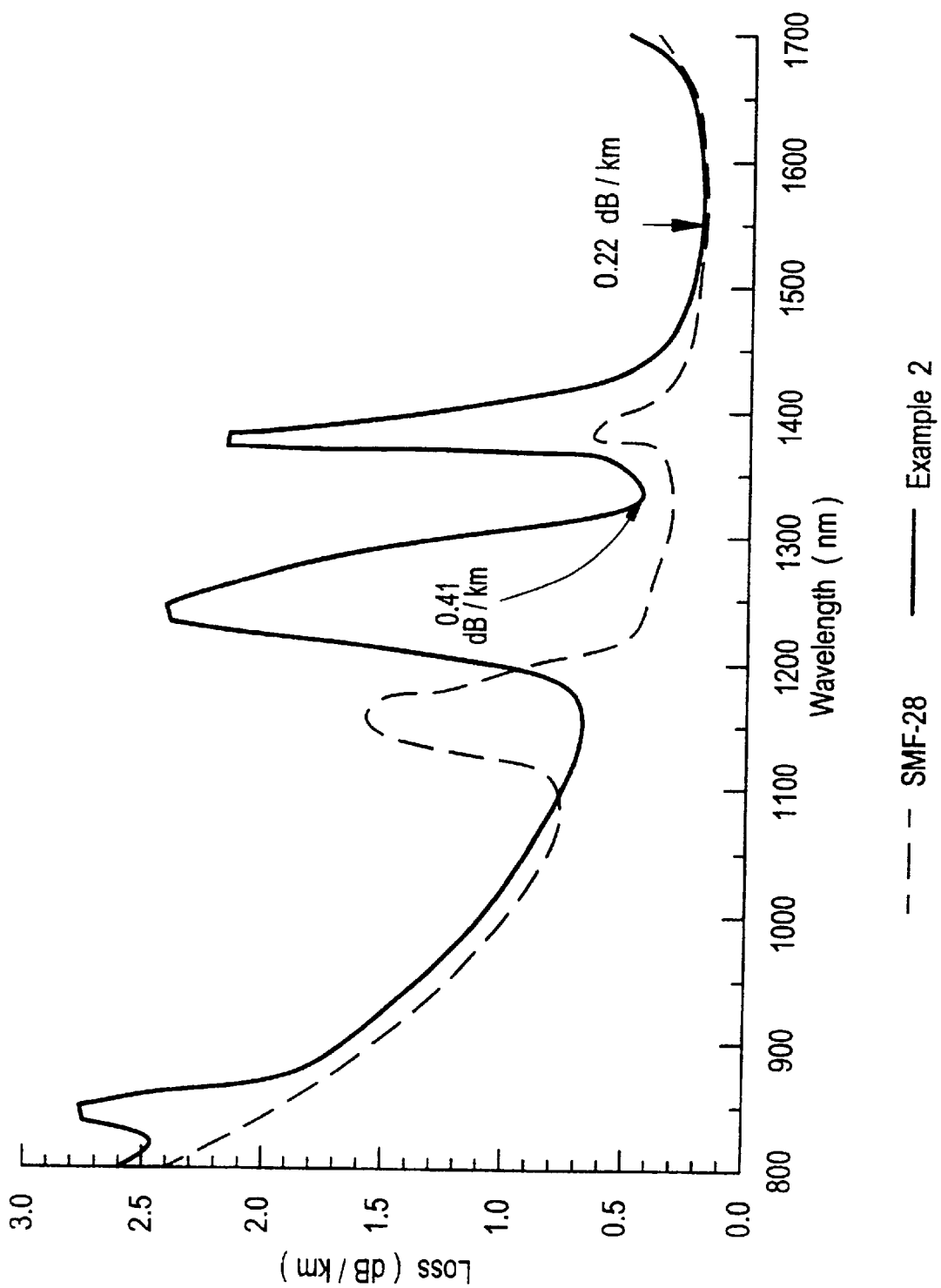
FIG. 4 is a plot of the spectral attenuation of an optical waveguide in accordance with the teachings of the present invention, with the Y-axis representing Loss (dB/km) and the X-axis representing Wavelength (nm).

The resulting preform was dried and consolidated in a helium and chlorine atmosphere to form a clear glass waveguide preform, which was formed into a cane preform. This preform was overcladded using the octamethylcyclotetrasiloxane and burner condition shown in the above table. This overcladded optical waveguide preform was consolidated into an optical fiber preform, which was drawn into a fiber. Such a method is most preferred in order to provide beneficial attenuation characteristics. FIG. 4 shows the spectral attenuation curve of this fiber as the solid curve and for comparison the dotted curve represents the spectral attenuation of a Corning SMF-28™ single-mode optical waveguide fiber. As in Example 1, it was surprising and unexpected that such a method of making optical fiber preforms using octamethylcyclotetrasiloxane throughout the soot deposition process along with germanium ethoxide would result in an optical fiber with such beneficial characteristics. This is a particularly good attenuation spectra for a fiber using new feedstocks. This is the most preferred method and feedstock of the invention because of the beneficial attenuation spectra with the fiber being low loss with an attenuation of less than 0.25 dB/km at 1550 nm.

EXAMPLE 3

$GeO_2$ doped $SiO_2$ soot was made from a feedstock mixture of germanium methoxide and octamethylcyclotetrasiloxane using the setup shown in FIG. 1. When liquid germanium methoxide and liquid octamethylcyclotetrasiloxane are used they are mixed by weight in a ratio ranging from 1 part germanium methoxide: 3 to 6 parts octamethylcyclotetrasiloxane, preferably 1 part germanium methoxide: 4 to 5 parts octamethylcyclotetrasiloxane. $GeO_2$ doped $SiO_2$ soot was made using the following conditions table:

TABLE II

| Feedstock Mix Ratio [SiO(CH₃)₂]₄:Germanium Methoxide (by wt.) | 4.5:1 |
|---|---|
| Delivery Rate of Feedstock Mixture (g/min) | 3.6 |
| Carrier N₂ (slpm) | 3 |
| Fume O₂ (slpm) | 4.5 |
| Inner Shield O₂ (slpm) | 2.5 |
| Premix CH₄ (slpm) | 2 |
| Premix O₂ (slpm) | 1 |
| Outer Shield O₂ (slpm) | 2 |
| Burner Stoichiometry | 2.4 |

These conditions resulted in a $GeO_2$ doped $SiO_2$ soot which contained 28.7 wt. % $GeO_2$.

The feedstock compositions of the invention and the method of use in forming optical waveguides are not only beneficial in that chlorine pollutants are not produced during soot deposition, but that chlorine is not incorporated into the soot in that the silicon and germanium components of the feedstocks are free of chlorine to start with. In addition, the absence of chlorine during deposition may improve metal impurity levels in the optical fiber.

It was found that germanium ethoxide when mixed with water is corrosive to metals. It is, therefore, preferred that the germanium ethoxide storage and delivery systems be free of metals, and in particular, it is preferred to use teflon components for parts in contact with the germanium ethoxide particularly when in the liquid state. In doing so, the metal impurities in the consolidated glass are reduced from a few ppm to a few ppb by weight. The germanium ethoxide source liquid used in the invention had metal impurity levels of Fe (<10 ppb), Ni (<10 ppb), Cr (<10 ppb), Cu (<10 ppb), and Al (<10 ppb). $GeO_2$ soot produced from such a liquid pumped through a stainless steel pump had metal impurity levels of Fe (790–2700 ppb), Ni (21–25 ppb), Cr (27–29 ppb), Cu (25–61 ppb), and Al (1300–4500 ppb). $GeO_2$ soot produced from such a liquid pumped through teflon components had metal impurity levels of Fe (44 ppb), Ni (<10 ppb), Cr (<10 ppb), Cu (<10 ppb), and Al (<10 ppb). Such a non-metallic delivery system resulted in a 10% $GeO_2$ doped $SiO_2$ soot of the invention having metal impurities of Fe (14–20 ppb), Ni (<17 ppb), Cr (<10 ppb), Cu (<10 ppb), and Al (<10 ppb). The analysis of a $GeO_2$–$SiO_2$ core of the invention showed metal impurities of Fe (10 ppb), Ni (<5 ppb), Cr (<10 ppb), and V (<10 ppb). The analysis of a $SiO_2$ clad of the invention showed metal impurities of Fe (10 ppb), Ni (20 ppb), Cr (<10 ppb), and V (<10 ppb). Such low metallic impurity levels are beneficial to the transmission and guiding of light.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

We claim:

1. A method of making a low loss optical waveguide preform comprising the steps of:
    (a) providing a fluid feedstock comprised of a siloxane and a germanium alkoxide;
    (b) delivering said fluid feedstock to a conversion site;
    (c) converting said delivered fluid feedstock into $GeO_2$ doped $SiO_2$ soot;
    (d) depositing said $GeO_2$ doped $SiO_2$ soot on a deposition surface; and
    (e) forming said deposited $GeO_2$ doped $SiO_2$ soot into an optical waveguide preform.

2. A method of making a low loss optical waveguide preform as claimed in claim 1, wherein the steps of delivering and converting further comprise delivering the fluid feedstock to a flame and converting said delivered fluid feedstock into $GeO_2$ doped $SiO_2$ soot with said flame.

3. A method as claimed in claim 1, wherein the step of providing a fluid feedstock comprised of a siloxane and a germanium alkoxide further comprises the step of providing a fluid feedstock comprised of octamethylcyclotetrasiloxane and germanium alkoxide.

4. A method as claimed in claim 3, wherein the step of providing a fluid feedstock comprised of octamethylcyclotetrasiloxane and germanium alkoxide further comprises the step of providing a fluid feedstock comprised of octamethylcyclotetrasiloxane and germanium ethoxide.

5. A method as claimed in claim 4, wherein the step of providing a fluid feedstock comprised of octamethylcyclotetrasiloxane and germanium ethoxide further comprises the step of mixing liquid octamethylcyclotetrasiloxane with liquid germanium ethoxide.

6. A method as claimed in claim 5, wherein the step of delivering said fluid feedstock further comprises the step of vaporizing said fluid feedstock.

7. A method as claimed in claim 1, wherein the step of forming said deposited $GeO_2$ doped $SiO_2$ soot into an optical waveguide preform further comprises the step of cladding said $GeO_2$ doped $SiO_2$ soot with $SiO_2$.

8. A method as claimed in claim 7, wherein the step of cladding said $GeO_2$ doped $SiO_2$ soot with $SiO_2$ further comprises the steps of providing a fluid feedstock comprised of a siloxane, delivering said fluid siloxane feedstock to a conversion site, and converting said delivered fluid siloxane feedstock into $SiO_2$ soot.

9. A method of making a low loss optical waveguide fiber comprising the steps of:
    (a) providing a fluid feedstock comprised of a siloxane and a germanium alkoxide;
    (b) delivering said fluid feedstock to a conversion site;
    (c) converting said delivered fluid feedstock into $GeO_2$ doped $SiO_2$ soot;
    (d) depositing said $GeO_2$ doped $SiO_2$ soot on a deposition surface;
    (e) forming said deposited $GeO_2$ doped $SiO_2$ soot into an optical waveguide preform; and
    (f) drawing said optical waveguide preform into a fiber.

10. A method as claimed in claim 9 wherein the steps of delivering and converting further comprise selecting the siloxane and the germanium alkoxide such that the preform can be drawn into a low loss optical fiber with an attenuation of less than 0.25 dB/km at 1550 nm and delivering the fluid feedstock to conversion site flame and converting said delivered fluid feedstock into $GeO_2$ doped $SiO_2$ soot with said conversion site flame, the step of forming said deposited $GeO_2$ doped $SiO_2$ soot into an optical waveguide preform further comprise consolidating said deposited $GeO_2$ doped $SiO_2$ soot, and drawing said optical waveguide preform into the low loss optical waveguide fiber having the attenuation of less than 0.25 dB/km at 1550 nm.

11. A silica glass optical waveguide forming feedstock comprised of a siloxane and an amount of germanium alkoxide sufficient to form a core having a refractive index appropriate for guiding light.

12. A silica glass optical waveguide forming feedstock as claimed in claim 11 comprised of octamethylcyclotetrasiloxane and a germanium alkoxide.

13. A silica glass optical waveguide forming feedstock as claimed in claim 11 comprised of octamethylcyclotetrasiloxane and germanium ethoxide.

14. A silica glass optical waveguide forming feedstock as claimed in claim 11 comprised of octamethylcyclotetrasiloxane and germanium methoxide.

15. A silica glass optical waveguide forming feedstock consisting essentially of a siloxane and an amount of germanium alkoxide sufficient to form a core having a refractive index appropriate for guiding light.

16. A silica glass optical waveguide forming feedstock as claimed in claim 15 consisting essentially of a siloxane and germanium ethoxide.

17. A silica forming feedstock as claimed in claim 15 consisting essentially of octamethylcyclotetrasiloxane and a germanium alkoxide.

18. An optical waveguide silica feedstock consisting of octamethylcyclotetrasiloxane and an amount of germanium ethoxide sufficient to form a core having a refractive index appropriate for guiding light.

19. A germanium doped silica glass optical fiber formed by the conversion of octamethylcyclotetrasiloxane and an amount of germanium ethoxide sufficient to form a core having a refractive index appropriate for guiding light.

20. A silica glass optical waveguide forming feedstock comprised of a siloxane and a bimetallic organogermyl.

21. A silica glass optical waveguide forming feedstock as claimed in claim 20 comprised of a siloxane and digermane.

22. A silica glass optical waveguide forming feedstock as claimed in claim 20 comprised of a siloxane and digermoxane.

23. A silica glass optical waveguide forming feedstock comprised of a siloxane and a germanium alkylalkoxide.

24. A silica glass optical waveguide forming feedstock comprised of a siloxane and a germanium alkyl.

25. A method of making a low loss optical waveguide perform as claimed in claim 1 further comprising selecting the siloxane and the germanium alkoxide such that the preform can be drawn into an optical fiber with an attenuation of less than 0.23 dB/km at 1550 nm and drawing the preform into the fiber.

26. A germanium doped silica glass optical waveguide as claimed in claim 19 having an attenuation of less than 0.23 dB/km at 1550 nm.

* * * * *

UNITED STATES PATENT AND TRADEMARK OFFICE
CERTIFICATE OF CORRECTION

PATENT NO. : 6,376,010 B1  
DATED : April 23, 2002  
INVENTOR(S) : Jeffery L. Blackwell, Lisa A. Moore and Carlton M. Truesdale It is certified that error appears in the above-identified patent and that said Letters Patent is hereby corrected as shown below:

<u>Title page,</u>  
Item [56], References Cited, FOREIGN PATENT DOCUMENTS, "EP 0463045 B1 1/1992 should read as -- EP 0453 045 B1 1/1992. --

Signed and Sealed this

Fourteenth Day of January, 2003

JAMES E. ROGAN  
*Director of the United States Patent and Trademark Office*